US00RE42216E

(19) United States
(12) Reissued Patent
Lee

(10) Patent Number: US RE42,216 E
(45) Date of Reissued Patent: Mar. 15, 2011

(54) FORMATION OF A DIELECTRIC LAYER INCORPORATING GREEN, BLUE AND RED COLORANTS ON AN UPPER SUBSTRATE OF A PLASMA DISPLAY PANEL

(75) Inventor: Yoon-Kwan Lee, Gwangmyeong (KR)

(73) Assignee: LG Electronics Inc., Seoul (KR)

(21) Appl. No.: 12/413,458

(22) Filed: Mar. 27, 2009

Related U.S. Patent Documents

Reissue of:
(64) Patent No.: 7,224,123
Issued: May 29, 2007
Appl. No.: 11/143,020
Filed: Jun. 1, 2005

U.S. Applications:
(62) Division of application No. 10/280,538, filed on Oct. 25, 2002, now Pat. No. 6,914,370.

(30) Foreign Application Priority Data

Nov. 30, 2001 (KR) ..... 2001-0075505

(51) Int. Cl.
*H01J 17/49* (2006.01)
*H01J 9/00* (2006.01)

(52) U.S. Cl. ..... 313/586; 445/25; 445/24; 313/582; 313/587

(58) Field of Classification Search ..... 313/582–587; 445/24–25
See application file for complete search history.

(56) References Cited

U.S. PATENT DOCUMENTS 4,359,663 A * 11/1982 Shinoda et al. ..... 313/582
6,084,349 A * 7/2000 Ueoka et al. ..... 313/587
6,097,151 A * 8/2000 Kim et al. ..... 313/586
2005/0052138 A1 * 3/2005 Kweon ..... 313/586

FOREIGN PATENT DOCUMENTS

JP 04036930 A * 2/1992
JP 04249032 A * 9/1992
JP 07021924 A * 1/1995
JP 09274107 A * 10/1997
JP 10112265 A * 4/1998
JP 2000195335 A * 7/2000
JP 2000226229 A * 8/2000
JP 2000228152 A * 8/2000

* cited by examiner

*Primary Examiner*—Mariceli Santiago
(74) *Attorney, Agent, or Firm*—Lee, Hong, Degerman, Kang & Waimey

(57) ABSTRACT

Disclosed are an upper substrate structure for a plasma display panel including a dielectric layer reinforcing color properties and a fabricating method thereof. The upper substrate structure comprises a sustain electrode formed on an upper glass substrate, a bus electrode formed on the sustain electrode, and an upper substrate dielectric layer formed over a lower part of the surface created by two electrodes and the glass substrate. There is also included a colorant having color properties of red, blue, and green colors, and a protection layer formed on the dielectric layer. The dielectric layer may include one or more colorants so that important properties of PDP such as selective brightness of desired color, color temperature, and color purity improvement can be controlled.

13 Claims, 4 Drawing Sheets

FORMATION OF A DIELECTRIC LAYER INCORPORATING GREEN, BLUE AND RED COLORANTS ON AN UPPER SUBSTRATE OF A PLASMA DISPLAY PANEL

Matter enclosed in heavy brackets [ ] appears in the original patent but forms no part of this reissue specification; matter printed in italics indicates the additions made by reissue.

CROSS-REFERENCE TO RELATED APPLICATIONS

This *application is a reissue application of U.S. Pat. No. 7,224,123 B2, which* is a division of application Ser. No. 10/280,538, filed *on* Oct. 25, 2002, now U.S. Pat. No. 6,914, 370, issued on Jul. 5, 2005, which [application] is hereby incorporated by reference in its entirety. Under 35 U.S.C. § 119, this application claims priority to Korean Application Serial No. PATENT-2001-0075505, filed on Nov. 30, 2001.

BACKGROUND OF THE INVENTION

1. Field of the Invention

The present invention relates to a plasma display panel, and particularly, a upper substrate structure of a plasma display panel (PDP) and fabricating method thereof for improving a contrast, a color temperature, and a color purity of PDP.

2. Description of the Background Art

Generally, a flat panel display apparatus can be divided into an emissive display device, and a non-emissive display device. As examples of the emissive display device, there are a field emission display (FED), a vacuum fluorescent display (VFD), an electro luminescence (EL), and the PDP, etc. In addition, as examples of the non-emissive display device, there are a liquid crystal display (LCD), and an electro chromic display (ECD), etc.

One of the most highlighted display devices is the plasma display panel (PDP). The PDP is a display device using a luminescence of visible ray which is generated by energy difference when a phosphor is excited by ultraviolet ray which is generated in plasma luminescence and returned to a base status, after injecting discharge gas in a discharge cell which is separated by a barrier rib.

The PDP can be divided into a DC type PDP and an AC type PDP according to waveform of applied driving voltage and a structure of the discharge cell. A difference between the DC type PDP and the AC type PDP is as follows.

In case of the DC type PDP, an electrode is exposed on a discharge area, and discharge current is flowed during the voltage is applied. Therefore, a resistance for restricting the current should be made on outer side. However, in case of the AC type PDP, an electrode is covered by a dielectric layer and a natural capacitive is formed to restrict the current, and the electrode is protected from a shock of ions during discharging.

Therefore, the AC type PDP which is used widely will be described in the present invention.

FIG. 1 is a cross sectional view showing a conventional PDP.

As shown therein, the conventional PDP comprises: a lower layer 2 formed on an upper part of a lower glass substrate 1; an address electrode 3 patterned on some upper part of the lower layer 2 as stripe shape; a lower substrate dielectrics 4 formed on an upper front surface of the lower layer 2 including the address electrode 3; a barrier rib 5 formed on the lower substrate dielectrics 4 for preventing a cross-talk with an adjacent discharge cell; a black top formed on an upper side of the barrier rib 5; a phosphor 6 of red, green, and blue colors formed to cover the black top, a side surface of the barrier rib 5, and the upper surface of the lower substrate dielectrics 4; a protection layer 7 disposed apart a predetermined distance from the upper side of the black top, and parallel to the lower substrate dielectrics 4; an upper substrate dielectrics 8, to which a bus electrode 9 and a sustain electrode 10 laminated with each other are inserted, formed on an upper part of the protection layer 7; and an upper glass substrate 11 formed on an upper part of the upper substrate dielectrics 8 and the sustain electrode 10. At that time, a discharge gas is filled between the upper substrate and the lower substrate. In the discharge gas, He, Ne, Ar, or mixed gas thereof is used to form buffer gas, and a small amount of Xe is used as a source of vacuum ultraviolet ray which makes the phosphor 6 be luminescent.

Operation of the conventional PDP will be described as follows.

When an electric field is applied to the address electrode 3, the bus electrode 9, and to the sustain electrode 10 to generate voltage difference between the upper and lower substrate electrodes, the discharge gas, that is, He—Ne gas or Ne—Xe gas which is formed inside the discharge cell defined by the barrier rib 5, the upper substrate and the lower substrate becomes plasma status to generate vacuum ultraviolet rays. The generated vacuum ultraviolet ray excites the phosphor 6 to generate the visible rays of red, green, or blue color. At that time, the generated visible ray is decided by the kind of phosphor 6, and accordingly, the respective discharge cell becomes a pixel representing the red, green, and blue color respectively. The visible ray is radiated outer side through the transparent upper dielectrics 8 and the upper glass substrate 11.

The upper dielectrics 8 is a layer contacting to the sustain electrode 10 using an indium tin oxide (ITO), and to the bus electrode 9 of metal electrode. And the upper dielectrics 8 uses glass of PbO type having high softening point.

Also, the upper dielectrics 8 includes Pb more than 40%, and the upper dielectrics 8 is made by applying paste in which borosilicate glass powder of 1~2 μm diameter and an organic binder are mixed in screen printing method, and baking at the temperature of 550~580° C.

The upper substrate dielectrics 8 fabricated as above has a dielectric constant within 10~15 range, and a transmittance of visible ray is about 85% at peak wavelength. That is, the visible ray generated in the phosphor 6 is not radiated to outer side totally, but loss of light is generated as the light passes the protection layer 7, the upper substrate dielectrics 8, and the upper glass substrate 11. Also, the transmittance of the upper substrate dielectrics 8 is for the peak wavelength of the visible rays, and the transmittance is lowered for the wavelengths of blue and red, and therefore, the luminescent efficiency is lowered greatly.

Also, the plasma generates the visible rays generated from the discharge gas itself, and near infrared ray (NIR) adjacent to the visible ray of 0.75~3 μm wavelength, as well as the ultraviolet rays in discharging. For example, the Ne gas which reduces the discharge voltage and makes the discharge stable is mixed with the Xe gas, that is, the discharge gas, however, the Ne gas generates the visible ray of orange color having 585 nm wavelength and generates the NIR by the discharging. In addition, a means for blocking the NIR, etc., and therefore, a color purity is lowered, a contrast is lowered, color temperature applying to the blue color mainly is reduced, and the signal of a remote controller is distorted by the NIR.

SUMMARY OF THE INVENTION

Therefore, an object of the present invention is to provide an upper substrate structure for a plasma display panel and fabrication method thereof which is able to block visible ray and near infrared ray (NIR) generated by a discharge of plasma, to control brightness selectively, to control color temperature, to improve color purity, and to provide optimized transmittance according to colors represented by respective pixels by including a dielectric layer for improving color properties of red, blue, and green colors on the upper substrate of the plasma display panel.

To achieve the object of the present invention, there is provided an upper substrate for a plasma display panel comprising: a sustain electrode formed on some lower part of an upper glass substrate; a bus electrode formed on some lower part of the sustain electrode; a dielectric layer formed on a lower entire surface of the sustain electrode, the bus electrode, and the upper glass substrate, and including colorant having color properties of red, blue, and green colors; and a protection layer formed on a lower part of the dielectric layer.

Also, to achieve the object of the present invention, there is provided a method for fabricating the upper substrate of PDP comprising the steps of: depositing ITO on an upper glass substrate, patterning to form a sustain electrode; forming a bus electrode on some upper part of the sustain electrode; forming a dielectric layer of single or multiple layers including colorant which improves color properties of red, blue, and green colors on a lower entire surface of the sustain electrode, the bus electrode, and the upper glass substrate; and forming a protection layer on a lower part of the dielectric layer.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
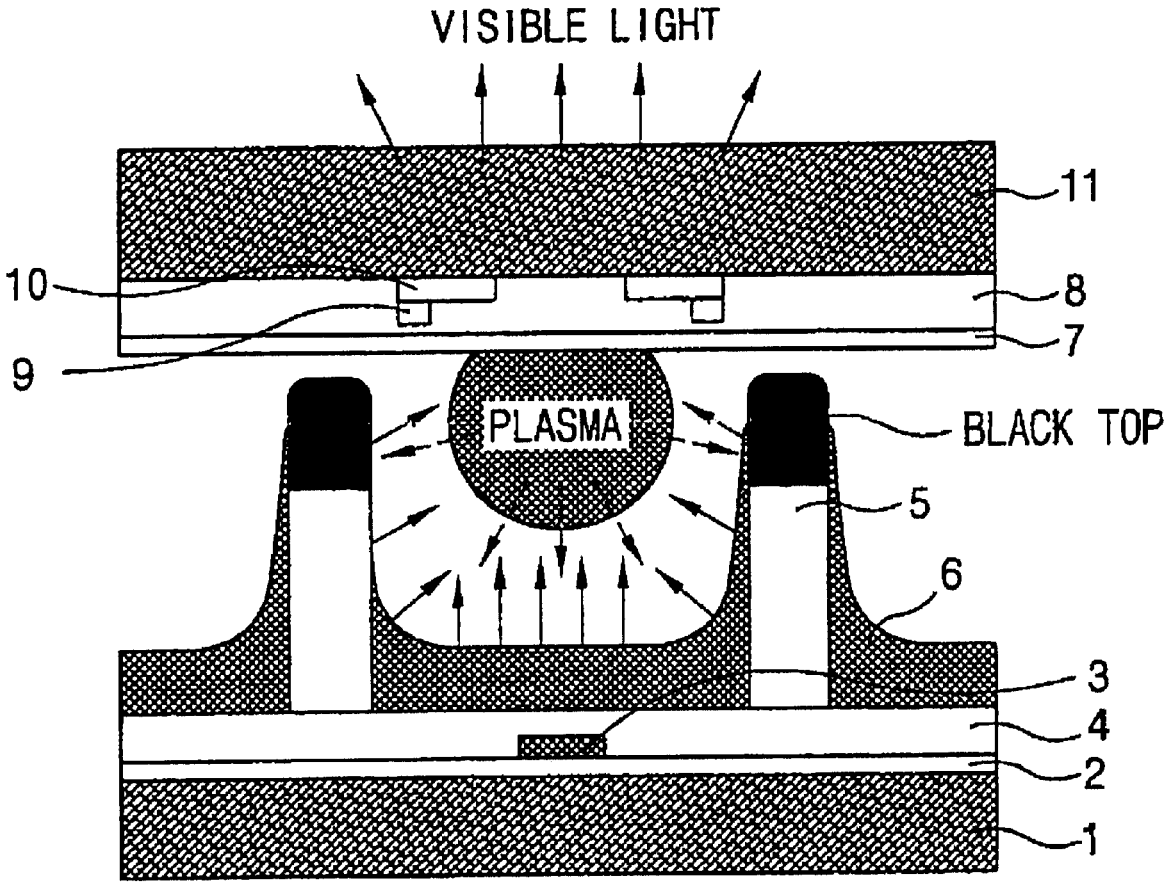
FIG. 1 PRIOR ART
FIG. 1 is a cross-sectional view showing a conventional plasma display panel.
Figure 2A:
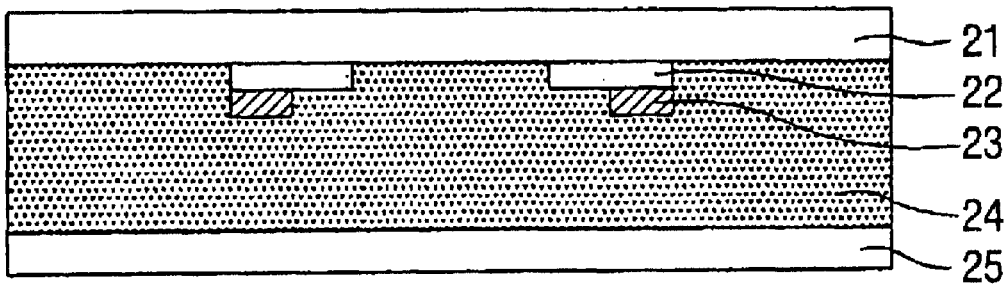
FIGS. 2A and 2B are cross-sectional views showing an upper substrate structure of a plasma display panel according to the present invention.
Figure 2B:
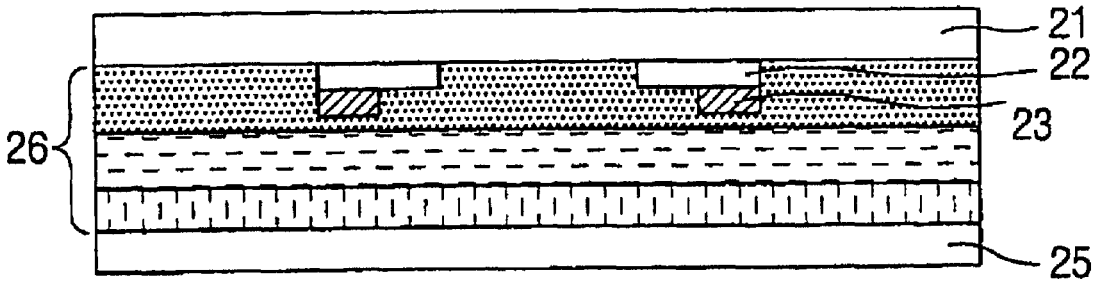

FIGS. 2A and 2B are cross sectional views showing an upper substrate structure of a plasma display panel (PDP) according to the present invention.

As shown therein, an upper substrate of a PDP according to the present invention comprises: a sustain electrode 22 formed on some lower part of an upper glass substrate 21; a bus electrode 23 formed on some lower part of the sustain electrode 22; an upper dielectric layer 24 formed on lower entire surface of the sustain electrode 22, the bus electrode, and the upper glass substrate 21, and including a colorant which improves color properties of red, green, and blue colors to control light transmittance of desired color; and a protection layer 25 formed on a lower part of the upper dielectric layer 24. At that time, the upper dielectric layer 24 is forming single dielectric layer by mixing a kind of colorant having red, green, blue properties in glass powder, or by mixing two or more kinds of colorants of same color type having red, green, blue properties as shown in FIG. 2A. Also, the upper dielectric layer is forming multiple dielectric layers 26 which are colored by different colors from each other by forming dielectric layers including colorants Of different color type having red, green, and blue color property alternately, as shown in FIG. 2B. The upper substrate structure of the PDP according to the present invention will be described as follows.

The upper glass substrate 21, the sustain electrode 22, the bus electrode 23, and the protection layer 25 have same compositions and structure as the upper substrate of the conventional PDP. However, the upper dielectric layer 24 functions as a color filter by including the colorant which improves the red, green, and blue color properties. That is, the upper dielectric layer 24 is formed by printing paste in which an organic binder, glass powder, and the colorant are mixed in screen printing method, and baking it. Therefore, a certain color is shown according to the colorant which is included in the upper dielectric layer 24, and another colors besides the visible ray corresponding to that color can be blocked. Also, a filtering effect can be gained as desired degree by changing the content of the colorant. In addition, when the content of the colorant is small, the filtering effect is also reduced, and therefore, the transmittances for the red, green, and blue colors can be controlled respectively.

Herein, the colorant included in the dielectric layer uses transition metal elements oxide, and rare earth elements oxide, more particularly, uses one or two kinds among $Nd_2O_3$, CoO, and $Co_3O_4$ representing blue color, $Fe_2O_3$, $Er_2O_3$ representing red color, and NiO, $Cr_2O_3$, $Pr_2O_3$ representing green color by mixing. Also, the colorant is mixed to be less than 30 weight % of the glass powder, and diameter of the particle is formed to be within 1~2 μm.

For example, the upper dielectric layer 24 may be formed by mixing 45~70% of PbO, 1~10% of $SiO_2$, 5~30% of $B_2O_3$, 0.1~5% of $Al_2O_3$, and 0.1~25% of colorant. After that, the paste in which the colorant is included is printed, and the paste is baked at the temperature of 540~580° C. so that the thickness of the dielectric layer 24 is to be 30~40 μm.

As described above, the upper dielectric layer includes the colorant to block the NIR generated from the plasma, and the visible ray of orange color having 582 nm of wavelength, and therefore, the color purity can be improved.

Figure 3:
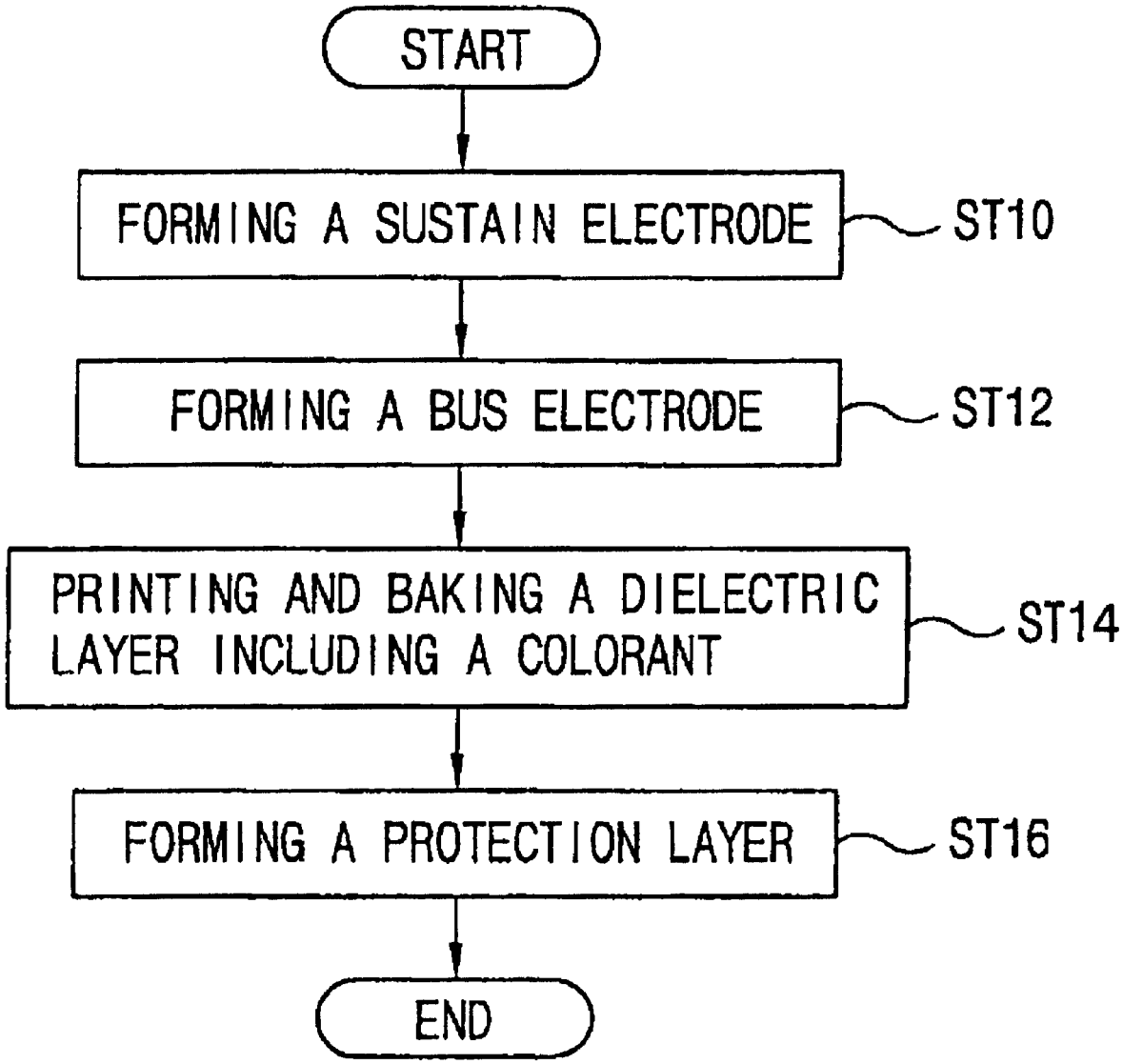
FIG. 3 is a flow chart showing a method for fabricating the upper substrate of the plasma display panel according to the present invention.

FIG. 3 is a flow chart showing a method for fabricating the upper substrate in the PDP according to the present invention.

As shown therein, the method for fabricating the upper substrate in the PDP according to the present invention comprises the steps of: depositing ITO on the upper glass substrate 21, and patterning to form the sustain electrode 22 (ST10); forming the bus electrode on some upper part of the sustain electrode 22 (ST12); forming the upper dielectric layer 24 including the colorant which improved the red, green, blue color properties on an upper part of the sustain electrode 22 and the bus electrode 23 (ST14); and forming the protection layer 25 on a lower part of the upper dielectric layer (ST16).

Herein, the upper dielectric layer 24 is formed to be a single layer by mixing a kind of colorant among red, green, and blue color with the glass powder, or by mixing two or more kinds of colorants in same color type having red, green, and blue properties.

Also, as another embodiment of the present invention, the upper dielectric layer 24 can be formed in multiple layers successive method.

Figure 4:
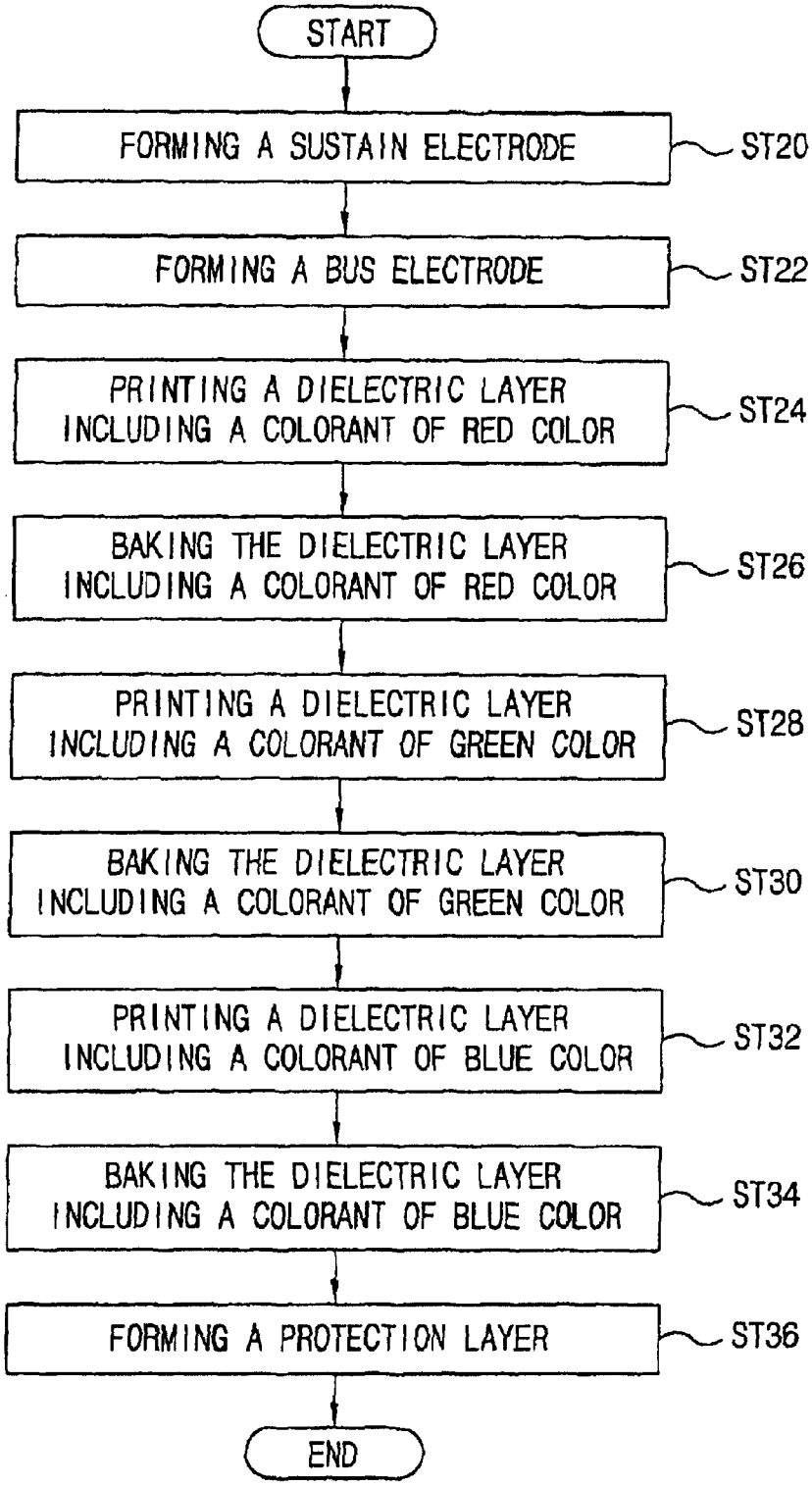
FIG. 4 is a flow chart showing a method for fabricating a dielectric layer on the upper substrate of the plasma display panel according to the present invention as multiple layers successive method.

FIG. 4 is a flow chart showing a method for fabricating the upper dielectric layer of the PDP according to the present invention in multiple layer successive method.

As shown therein, the method for fabricating the upper substrate in the PDP according to the present invention comprises the steps of: depositing ITO on the upper glass substrate 21, and patterning to form the sustain electrode 22 (ST20); forming the bus electrode on some upper part of the sustain electrode 22 (ST22); forming multiple dielectric layers 26 colored by different colors by forming dielectric layers including different colorants improving the red, green, and blue color properties alternately on an upper part of the sustain electrode 22 and the bus electrode 23 (ST24~ST34); and forming the protection layer 25 on a lower part of the upper dielectric layer 26 (ST36).

For example, the upper dielectric layers 26 of multiple layers can be formed by applying and baking a layer including $Fe_2O_3$ of red color type as a first layer (ST24, ST26), applying and baking a layer including NiO of green color type as a second layer (ST28, ST30), and applying and baking a layer including $Nd_2O_3$ of blue color type as a final layer (ST32, ST34). However, in case of forming multiple dielectric layers 26 as described above, if the density of the colorant is high, the light is not transmitted. Therefore, a very small amount of colorant is added to control the transmittance. Also, one or two colorants are added in the single dielectric layer 24 or multiple dielectric layer 26 to reduce or increase brightness uniformity of a certain color for the red, green, and blue colors for controlling entire brightness.

For example, in case of using $Nd_2O_3$ which is the colorant of blue color, $ZnSiO_4$:Mn which is the phosphor generating green color visible rays is overlapped with a peak wavelength on 525 nm wavelength, and therefore, the brightness is reduced. In order to prevent the brightness being reduced, 0.1~2% of colorant which improves the green color is mixed together in case of using the $Nd_2O_3$.

Also, to control the color temperature is important in the display device. In addition, in order to reinforce the blue color which affects to the color temperature most, the dielectric layer 24 including the blue color colorant $Nd_2O_3$, CoO, $Co_3O_4$ is used. That is, in case that the transparent dielectrics is used, the light transmittance is high in order of green, red, and blue color, and therefore, it is not easy to control the color temperature. However, in case that the dielectrics including the colorant according to the present invention is used, the light transmittance of blue color is increased to control the color temperature easily. Therefore, the light transmittance of blue color is increased relatively by the dielectric layer 24 including the $Nd_2O_3$, CoO, $Co_3O_4$.

According to the present invention, the upper substrate dielectric layer 24 including a kind of colorant among the red, green, and blue colors may be constructed, the upper substrate dielectric layer 24 including two or more kinds of colorants in same layer may be constructed, or the upper substrate dielectric layer 24 of multiple layers including a kind of colorant respectively may be constructed.

Therefore, the dielectric layer is functioned as a color filter, and thereby, the properties of the PDP, such as brightness, the color temperature, and the color purity can be controlled.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

[1. A method for fabricating an upper substrate for a plasma display panel comprising the steps of:

depositing indium tin oxide (ITO) on an upper glass substrate, and patterning the same to form a sustain electrode;

forming a bus electrode on some upper part of the sustain electrode;

forming an upper substrate dielectric layer including colorant which reinforces color properties of red, blue, and green colors on a lower entire surface of the sustain electrode, the bus electrode, and the upper glass substrate; and forming a protection layer on a lower part of the dielectric layer;

wherein the upper dielectric layer is formed by mixing 45~70% of PbO, 1~10% of $SiO_2$, 5~30% of $B_2O_3$, 0.1~5% of $Al_2O_3$, and 0.1~25% of colorant.]

[2. The method of claim 1, wherein the upper substrate dielectric layer is formed to be a single layer by mixing a kind of colorant having red, green, and blue color property in glass powder, or mixing two or more kinds of colorants of same color type having red, green, blue property in the step of forming the upper substrate dielectric layer.]

[3. The method of claim 1, wherein the upper substrate dielectric layer is formed to be multiple layers which are colored by different colors from each other by forming dielectric layers including colorants of different color type having red, green, and blue color property alternately in the step of forming the upper substrate dielectric layer.]

[4. The method of claim 1, wherein the colorant uses one or more kinds among $Nd_2O_3$, CoO, and $Co_3O_4$ representing blue color, $Fe_2O_3$, $Er_2O_3$ representi red color, and NiO, $Cr_2O_3$, $Pr_2O_3$ representing green color after mixing them, and the upper substrate dielectric layer is a single layer including a kind of colorant among the red, green, and blue colors, a single layer including two or more kinds of colorants in the same layer, or multiple layers including dielectric layers mixing colorants of different color type having red, green, and blue properties alternately.]

[5. The method of claim 1, wherein the colorant uses one or more kinds among $Nd_2O_3$, CoO, and $Co_3O_4$ representing blue color, $Fe_2O_3$, $Er_2O_3$ representing red color, and NiO, $Cr_2O_3$, $Pr_2O_3$ representing green color after mixing them in the step of forming the upper substrate dielectric layer.]

*6. A method for fabricating an upper substrate for a plasma display panel comprising the steps of:*

*forming a sustain electrode on an upper class substrate;*

*forming a bus electrode on the sustain electrode; and*

*forming an upper substrate dielectric layer comprising a red colorant, a blue colorant, and a green colorant on surfaces of the upper glass substrate, the sustain electrode, and the bus electrode,*

*wherein the upper substrate dielectric layer is formed by mixing 45 to 70 percent of PbO, 1 to 10 percent of $SiO_2$, 5 to 30 percent of $B_2O_3$, 0.1 to 5 percent of $Al_2O_3$, and 0.1 to 25 percent of the red colorant, the blue colorant and the green colorant.*

*7. The method of claim 6, wherein a thickness of the upper dielectric layer ranges between 30 and 40 μm.*

*8. The method of claim 6, wherein the blue colorant comprises $CO_3O_4$.*

*9. The method of claim 6, wherein the green colorant comprises NiO.*

*10. The method of claim 6, wherein the red colorant comprises $Fe_2O_3$.*

*11. The method of claim 6, wherein the upper substrate dielectric layer is formed in a single layer.*

*12. The method of claim 6, wherein the upper substrate dielectric layer is formed in multiple layers.*

*13. The method of claim 6, wherein the red colorant, the blue colorant or the green colorant comprises a transition metal element oxide.*

*14. The method of claim 6, wherein the red colorant, the blue colorant or the green colorant comprises a rare earth element oxide.*

*15. The method of claim 6, wherein the blue colorant is selected from the group consisting essentially of $Nd_2O_3$, CoO, and $Co_3O_4$.*

*16. The method of claim 15, wherein the forming the upper substrate dielectric layer comprises applying 0.1 to 2 percent of the green colorant to the upper substrate dielectric layer when $Nd_2O_3$ is used as the blue colorant.*

*17. The method of claim 6, wherein the red colorant is selected from the group consisting essentially of $Fe_2O_3$ and $Er_2O_2$.*

*18. The method of claim 6, wherein the green colorant is selected from the group consisting essentially of NiO, $Cr_2O_3$, and $Pr_2O_3$.*

* * * * *